(12) United States Patent
Baeumer et al.

(10) Patent No.: US 6,241,502 B1
(45) Date of Patent: Jun. 5, 2001

(54) TAKE-OFF APPARATUS FOR PLASTIC TUBULAR SHEETS

(75) Inventors: Josef Baeumer, Hopsten; Gerd Ratz, Lienen, both of (DE)

(73) Assignee: Klaus Reinhold Maschinen- und Geraetebau GmbH, Lengerich (DE)

( * ) Notice: Subject to any disclaimer, the term of this patent is extended or adjusted under 35 U.S.C. 154(b) by 0 days.

(21) Appl. No.: 09/065,214

(22) Filed: Apr. 23, 1998

(30) Foreign Application Priority Data

Apr. 24, 1997 (DE) .......................................... 297 07 373 U (51) Int. Cl.[7] .................................................. B29C 53/00

(52) U.S. Cl. .................. 425/72.1; 425/326.1; 425/387.1; 425/392

(58) Field of Search ............................... 425/72.1, 326.1, 425/387.1, 392

(56) References Cited

U.S. PATENT DOCUMENTS

| | | | |
|---|---|---|---|
| 3,768,949 | * 10/1973 | Upmeier | 425/392 |
| 5,013,234 | 5/1991 | Reinhold | 425/327 |
| 5,437,544 | * 8/1995 | Achelpohl | 425/72.1 |

FOREIGN PATENT DOCUMENTS 2035584    3/1972  (DE) .

* cited by examiner

*Primary Examiner*—Nam Nguyen
*Assistant Examiner*—Donald Heckenberg
(74) *Attorney, Agent, or Firm*—Jordan and Hamburg LLP (57) ABSTRACT

Take-off equipment for tubular sheets are provided for plastic film produced by an extruder with a stationary blowing head. Collapsing boards collapse the tubular sheet with expanded circular cross section, and stationary conveying equipment transports the collapsed tubular sheet to stationary wind-up equipment. A reversing system with at least one deflecting roller and at least one turning bar is pivotably supported between the collapsing boards and the stationary conveying equipment. The reversing system includes at least two turntables which are at a distance from one another vertically corresponding to the at least one deflecting roller and the at least one turning bar. The turntables lie with their centers in a central vertical axis of the equipment and can be driven in a reversing manner each over a planet wheel to different turning angles. The planet wheels are constructed in each case as open planetary gears with the associated turntable having a sun wheel. The cross members carrying the respective planet wheel are combined into a common gearing bridge, and the gearing bridge forms a swiveling frame in which the turntables as well as the deflecting rollers and the turning bars are supported.

12 Claims, 10 Drawing Sheets

TAKE-OFF APPARATUS FOR PLASTIC TUBULAR SHEETS

The invention relates to a pull-off apparatus for plastic tubular sheets, produced by an extruder with a stationary blowing head.

BACKGROUND OF THE INVENTION

Thickness tolerances cannot be avoided during the production of plastic sheets from plastic film by film blowing. These tolerances arise, for example, because of the customary manufacturing tolerances in the blowing head of the extruder used for the production of the film, and in the sizing unit through which the tubular sheet passes with an expanded circular cross section after the extrusion process, because of the internal and external cooling or due to other external circumstances. When such tubular sheets are rolled up in the collapsed state in wind-up equipment, the addition of the thickness tolerances would result in annular elevations, if there were no suitable countermeasures on the winder. These elevations would result in a lasting deformation of the film in this region and would make the printing and further processing of the tubular sheet difficult.

As a suitable countermeasure for preventing the formation of annular elevations on the film winder, so-called reversing take-off devices for the tubular sheet have been developed, in the case of which, during the collapsing of the tubular sheet, the reversing motion of the participating parts of the apparatus bring about a periodic migration of the folded edges, which are formed during the collapsing of the tubular sheet. Associated with this is a corresponding distribution of possible thickness tolerances over the width of the collapsed tubular sheet. During the subsequent winding up of the collapsed tubular sheet or of the individual sheets, previously severed in half, on wind-up equipment, the formation of annular elevations on the reeled film by the addition of thickness tolerances of the film is avoided in this manner. It is self-evident that it is necessary, at the same time, to select a swiveling angle of sufficient magnitude for the reversing motion.

In the case of a known apparatus (DE-C 20 35 584), the collapsing boards with their nip rolls are swiveled in a reversing manner over an angle of about 360° about the axis of the tubular sheet supplied and it has turned out that this swiveling angle of a reversing motion is appropriate for most of the applications of reversing take-off equipment. Aside from two rotatable deflecting rollers for deflecting the sheet by about 180°, two turning bars, which cannot be rotated, for deflecting the sheet by about 180° while simultaneously changing the direction, are provided one behind the other and alternating with one another. On the other, in those cases, in which the swiveling angle of the reversing motion of the collapsing boards with their nip rolls is less than 360°, a single turning bar between the two deflecting rollers is sufficient for handling the tubular sheet in the reversing part of the take-off apparatus. However, it is also possible to use more than two deflecting rollers and turning bars.

In the case of the known take-off apparatus, the deflecting rollers and the turning bars in the apparatus are supported pivotably about the axis of the tubular sheet supplied in such a manner, that the axes of the deflecting rollers and of the turning bars extend tangentially to the circles about the axis of rotation of the collapsing boards, the deflecting rollers, in all possible operating positions, being radially outside of the parts of the turning bars looped by the tubular sheet. The swiveling angles of the deflecting rollers and of the turning bars decrease as the distance from the collapsing boards increases and the film bubble is passed between the deflecting rollers and turning bars, as well as the stationary conveying equipment for transporting away the collapsed tubular sheet in mutually parallel, horizontal planes. By these means, a small overall height of the reversing system is attained. Moreover, due to the fact that the radius of the circle, circumscribed by the swiveling path of the axes of the turning bars, is $\pi/4 \times$ diameter of the turning bar, a lateral course of the tubular, plastic film sheet during the swiveling of the reversing system is counteracted. At the same time, it turns out that the intersection of the center lines of the tubular sheet extrudates, running towards and away from the turning bars, lies in the central swiveling axis of the reversing system. During the reversing swiveling motion, it is thus ensured that the tubular film extrudates open and close in scissor fashion about the swiveling axis, so that theoretically mutually opposite, identical friction forces act symmetrically on the two tubular sheet extrudates and thus, by design, the axial shifting of the tubular sheet on the turning bars, during the reversing operation resulting from unilaterally acting frictional forces, is avoided.

In the case of the known take-off apparatus, the collapsing boards, the deflecting rollers and the turning bars, for carrying out their reversing pivoting motions, are all supported at a relatively thin middle shaft, which extends in a vertical extension of the axis of the supplied tubular sheet and is supported rotatably in the apparatus frame. The total weight of the reversing system is supported by the middle shaft. As a result, the reversing system is very susceptible to fluctuations and to oscillating motions which, especially due to the long vertical take-off path corresponding to the height, at which the take-off equipment is disposed, set in very quickly when, for example, an operator moves on the associated gangway of the take-off equipment. Moreover, it is time-consuming and cumbersome to install and maintain the known reversing system and, in particular, also to introduce the tubular sheet into the take-off apparatus at the start of an extrusion process because of the supporting shaft, which is disposed in the center of the equipment in an extension of the axis of the tubular sheet supplied, because this central region is not readily accessible and occupied partly by the tubular sheet, which is being conveyed through the apparatus.

The EP-B-0 408 996 describes a known take-off apparatus with several turntables which are disposed vertically above one another and can be driven in a reversing manner over a reversing transmission with different swiveling angles. The frame for the equipment comprises an upper, horizontal support part with a holding frame for supporting the turntables on the underside so that they can rotate and, for forming a set of compression-stressed turntables rotatable about the axis of the tubular sheet, the turntables and holding frames are supported directly on one another or on the holding frame over interposed roll bodies. For this known configuration, the internal diameter of the turntables is selected to be equal to the maximum working width of the equipment, which corresponds to the largest possible sheet width of the collapsed tubular hose that can be handled in the equipment. On the basis of these dimensional relationships, the set of turntables represents a stable structure, by means of which interfering fluctuations and oscillating motions are practically excluded when anyone is walking on the gangways or working platforms mounted on the frame of the equipment. On the other hand, however, the accessibility of the reversing system from the direction of the collapsing boards is impeded by the interposed set of turntables with its holding frame.

SUMMARY OF THE INVENTION

It is therefore an object of the invention to provide take-off equipment of the generic type while retaining the kinematics of the reversing system explained by means of the above-named DE-C 20 35 584 and the thereby achieved controlled guidance of the tubular sheet from a stationary tubular-film blowing head through the reversing take-off equipment to the once again stationary wind-up equipment, for which, on the ore hand, the reversing system has an improved stability, which avoids interfering fluctuations and oscillating motions and, on the other, good accessibility to the reversing system from the collapsing boards is assured.

Owing to the fact that, for this development, the planet wheel gearing in each case is constructed as an open planetary gear, for which the cross members, carrying the respective planet wheel, are combined into a common gearing bridge as a modular unit, a stable holding construction is created, which makes it possible to do without a central supporting shaft, disposed coaxially in the central vertical axis of the equipment, for driving the individual planet wheel gearings and in combination with the turntables, counteracting the introduction of swiveling and oscillating motions due to their construction, brings about a high overall stability of the equipment. Moreover, since in the case of the inventive development, the turntables as well as the deflecting rollers and turning bars with their holding devices are supported in the gearing bridge forming a swiveling frame, the design prerequisites for a simple guidance of the collapsed tubular film from the collapsing boards past a turntable or a holding frame, provided for this on the equipment, to a first deflecting roller are provided, so that, while having good accessibility to the reversing system, the tubular film can also be easily drawn into the reversing system, especially at the start of an extrusion process.

Numerous farther distinguishing features and advantages of the invention arise out of the dependent claims and the description below in conjunction with the drawing, in which an example of the object of the invention is illustrated strictly diagrammatically.

DESCRIPTION OF THE PREFERRED EMBODIMENTS

Figure 1:
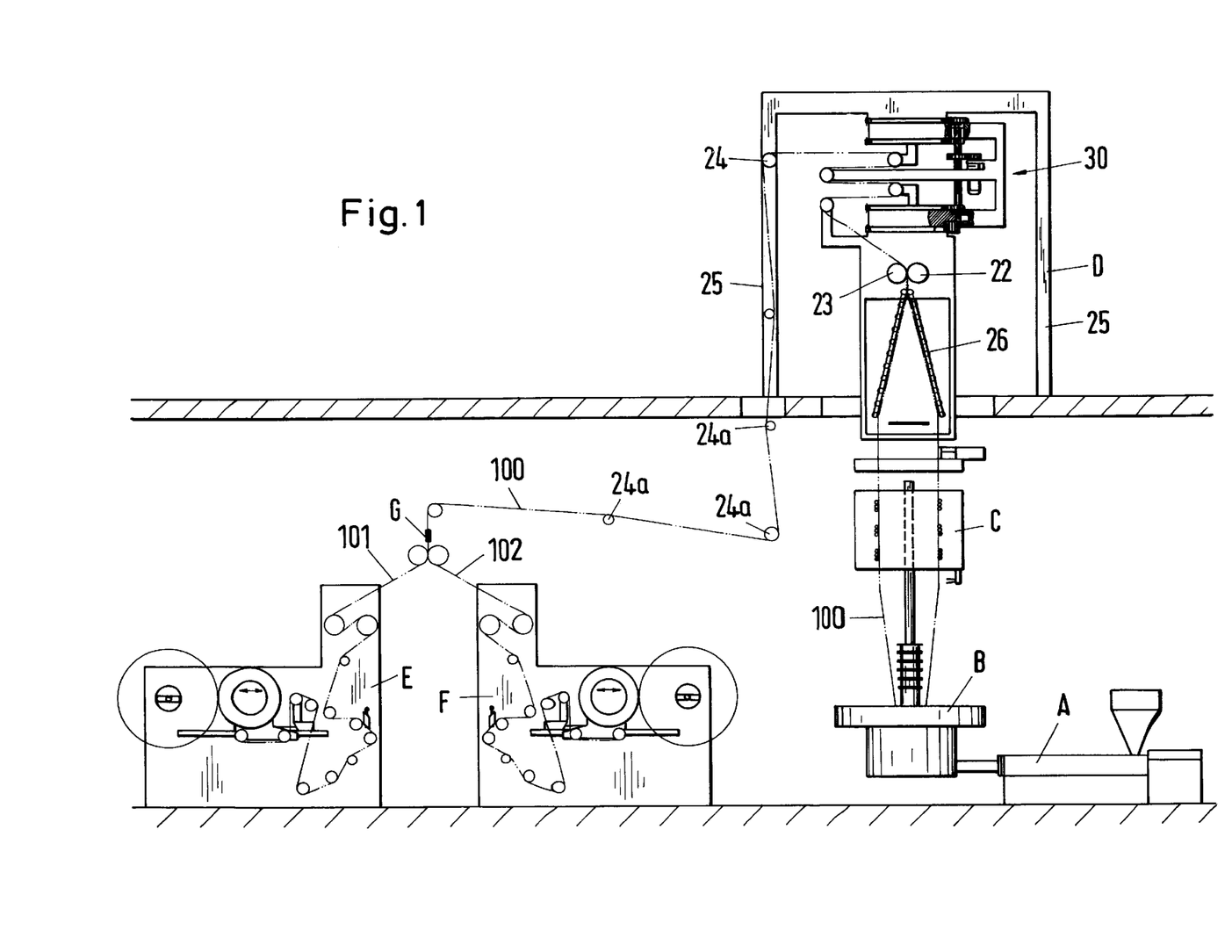
FIG. 1 diagrammatically shows a blown film extrusion line.

In FIG. 1, a diagrammatic overview of a blown film extrusion line with an extruder A is shown, which is stationary and supported on the floor of a manufacturing plant. The extruder A has a blowing head B which, in turn, is stationary and supported at the extruder A. The melt, produced in extruder A from a plastic granulate, is delivered by the blowing head B as a tubular sheet 100 with an expanded round or circular cross section and supplied over a sizing unit C and collapsing boards 26, adjoining which there are nip rolls 22 and 23, to reversing equipment, which is labeled 30 as a whole. At the same time, the tubular sheet 100 is guided vertically from the blowing head B of the extruder A over a distance, which is larger than that required for cooling and consolidating the plastic film, in the upward direction to the take-off equipment 30, which accordingly is customarily disposed in the ceiling area of the manufacturing plant For this purpose, the take-off equipment 30 comprises an equipment frame D, which is supported by four vertical supports 25 on an intermediate ceiling of the manufacturing plant. From a deflecting roller 24, mounted freely rotatable between two equipment supports 25 (on the left in FIG. 1), the collapsed tubular sheet 100, after passing through the nip rolls 22, 23, moves through an opening in the intermediate ceiling over a series of stationary guide rolls 24a, which are, however, free to rotate, to severing equipment G, in which the tubular sheet 100 is divided into halves into two individual flat sheets 100 and 102, which are then supplied to a windup unit E or F and wound up there into rolls. The wind-up units E and F exert with their wind-up motors the necessary take-off force on the tubular sheet 100, the deflecting roller 24 forming stationary conveying equipment with respect to the reversing system of the take-off equipment 30.

In the case of the example shown in the drawing (FIG. 2), the reversible take-off system comprises four turntables 1 to 4, which are obtainable on the market in the version obtained as standard components with an inner ring 31 and a denticulated outer ring 32 at the outer circumference. Preferably, turntables with a minimum internal diameter of 600 mm are used. This internal diameter can be made use of for supplying energy. The turntables 1 to 4 all have the same graduated circle and, with their center points, lie in the central vertical axis 27 of the reversing take-off equipment 30.

Figure 2:
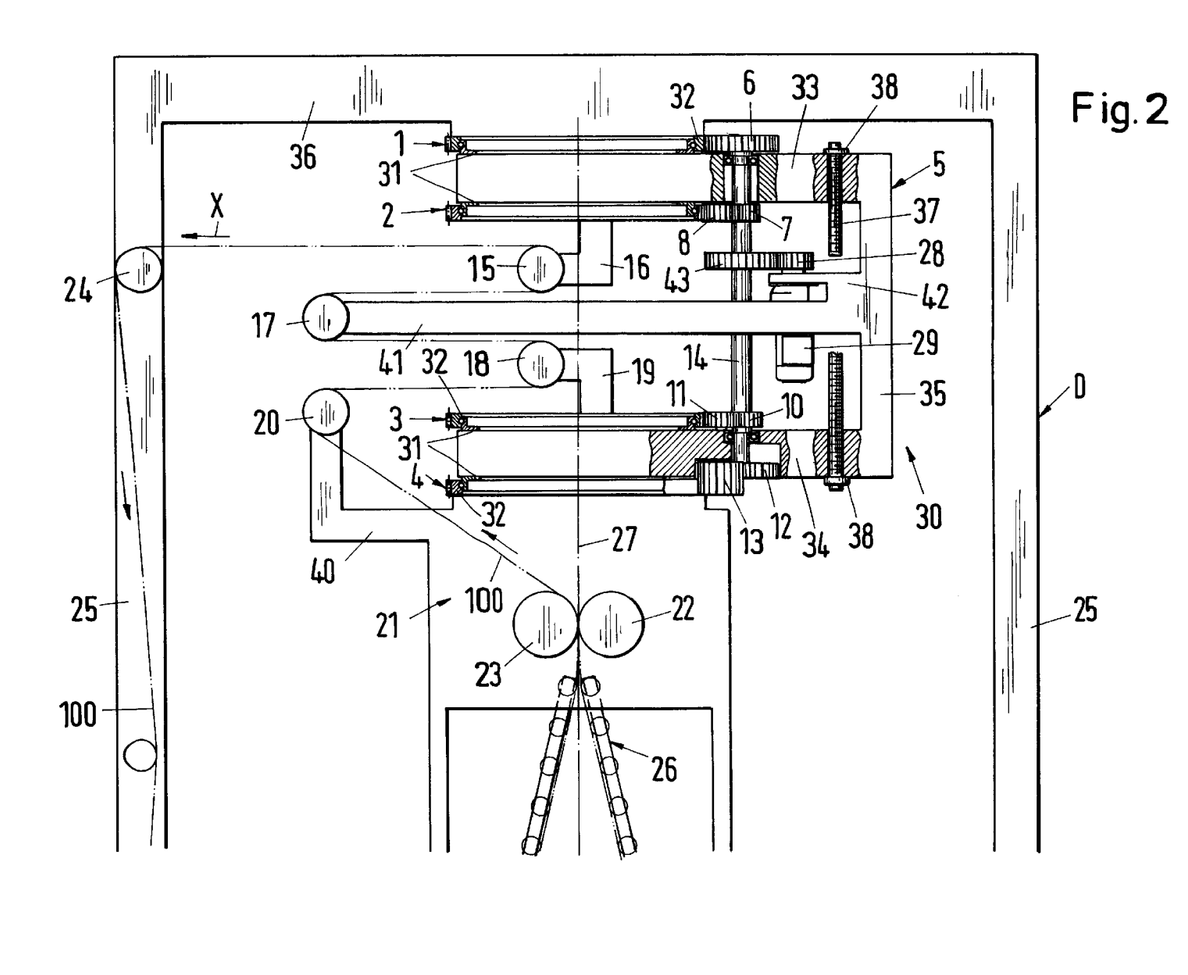
FIG. 2 shows a side view of take-off equipment, used for the blown film extrusion line of FIG. 1, with a reversing system for a tubular sheet produced by extrusion.

Each of the turntables 1 to 4 is driven reversibly with different swiveling angles over a planet wheel gearing. In this connection, each planet wheel gearing is constructed as an open planetary gear with the denticulated outer ring 32 of the associated turntable 1 to 4 as sun wheel and a planet wheel 6, 7, 10, 12 assigned to this.

The cross members, carrying the respective planet wheel 6, 7, 10, 12, are combined into a common cross member 5, which forms a gearing bridge. At the same time, the gearing bridge 5 forms a swiveling frame, which is constructed open in the take-off direction (arrow X in FIG. 2) in the tubular sheet 100 and comprises an upper, horizontal frame leg 33, a lower, horizontal frame leg 34 and a vertical frame leg 35 connecting these at the side opposite to the open frame side. The two frame legs 33 and 34 serve to support the turntables 1 to 4.

In particular, the upper horizontal frame leg 33 supports the inner ring 31 of the upper turntable 1, the outer gear ring 32 of which is fixed to the underside of an upper horizontal stanchion 36 of the equipment frame D. The lower horizontal frame leg 34 supports the inner ring 31 of the lower turntable 4, the outer gear ring 32 is fastened to a side frame 21, which carries the collapsing boards 26 as well as the nip rolls 22 and 23 and, over an extension arm 40, a deflection roller 20, which is the first deflection roller in the take-off direction X of the tubular sheet 1 and is mounted freely rotatably in the two arms of the extension arm 40, which is constructed in the form of two arms.

The inner ring 31 of the upper turntable 1 is supported on the upper side of the upper frame leg 33, at the underside of which the inner ring 31 of the turntable 2 is fixed. The inner ring 31 of the lower turntable 4 is fixed at the underside of the lower frame leg 34, on the upper side of which, once again, the inner ring 31 of the turntable 3 is supported.

Corresponding to the four turntables 1 to 4, two deflecting rollers 17 and 20 as well as two turning bars 15 and 18, which are disposed in each case alternately one above the other in horizontal planes, which vertically are at a distance from one another, are used. The first deflecting roller 20 is supported over the frame 21 at the outer gear ring 32 of the turntable 4. On the other hand, the deflecting roller 17, which is the second deflecting roller in the take-off direction X, is supported at the gearing bridge 5 in an intermediate region between the two horizontal frame legs 33, 34 of the swiveling frame or of the gearing bridge 5. The deflecting roller 17 is mounted freely rotatably between an extension arm, which is constructed in the form of two arms 41 and, starting out from a region adjoining the vertical frame leg 35 of the gearing bridge 5, extends through a vertical plane containing the central vertical axis 27 to the open side of the swiveling frame 5.

The two turning bars 15 and 18, which can be constructed as so-called air turning bars, are held non-rotatably, as is customary, between the two ends of the two arms of the holding devices 16 and 19, which are once again constructed in the form of two arms. The holding device 16 of the turning bar 15 is fixed to the outer gear ring 32 of the turntable 3 in a plane above the deflecting roller 17. On the other hand, the holding device 19 of the turning rod 18 is fixed at the outer gear ring 32 of the gear ring 3 in a plane below the plane of the deflecting roller 17.

The gearing bridge 5 has a self-contained construction, which imparts such a stiffness to it, that it is possible to do without a center shaft having a supporting function. In order to be able to counteract an expansion of the gearing bridge 5 under the action of the weight suspended from it, especially when heavy collapsing boards 26 with heavy nip rolls 22, 23 are used, connecting rods 37 can, as indicated in FIG. 2, be clamped in an appropriate arrangement and number in a vertical alignment between frame legs 33 and 34, which are tightened appropriately by tensioning nuts 38 on the upper side of the upper frame leg 33 or the underside of the lower frame leg 34. These connecting rods 37 can also be used advantageously for aligning the reversing transmission.

In principle, it is possible to provide each turntable 1 to 4 with its own driving mechanism for driving the individual planetary gears. For these individual driving mechanisms, the gearing bridge 5 could be provided with appropriate supports. However, it is also possible to mount all the individual driving mechanisms permanently on the outside of the equipment frame D, in order to drive the individual turntables 1 to 4 at the desired speed. In this connection, the driving speed of the driving mechanisms would have to be matched accurately to one another.

In the case of the example shown, however, all turntables 1 to 4 are driven in a reversing manner by a common driving motor 29 over a common drive shaft 14 with the appropriate transmission ratio. The transmission motor 29 is supported in a seat 42 close to the vertical frame leg 35 in order to drive one of the planet wheels 6, 7, 10, 12 directly over a driving gear wheel 28 or, as shown in FIG. 2, over a gear wheel 43, drive the drive shaft 14, which is supported rotatably in the gearing bridge 5 parallel to the central vertical axis 27, however, at a vertical distance from the latter.

The planet wheels 6, 7, 10, 12 of the individual planetary gears are fixed on the drive shaft 14 at a mutual vertical distance from one another corresponding to the turntables 1 to 4. In this connection, the planet wheels 6, 7, 10, 12 partially mesh directly and partially mesh over one or several intermediate wheels with the outer tooth ring 32 of the respective turntable 1, 2, 3, 4.

Figure 3:
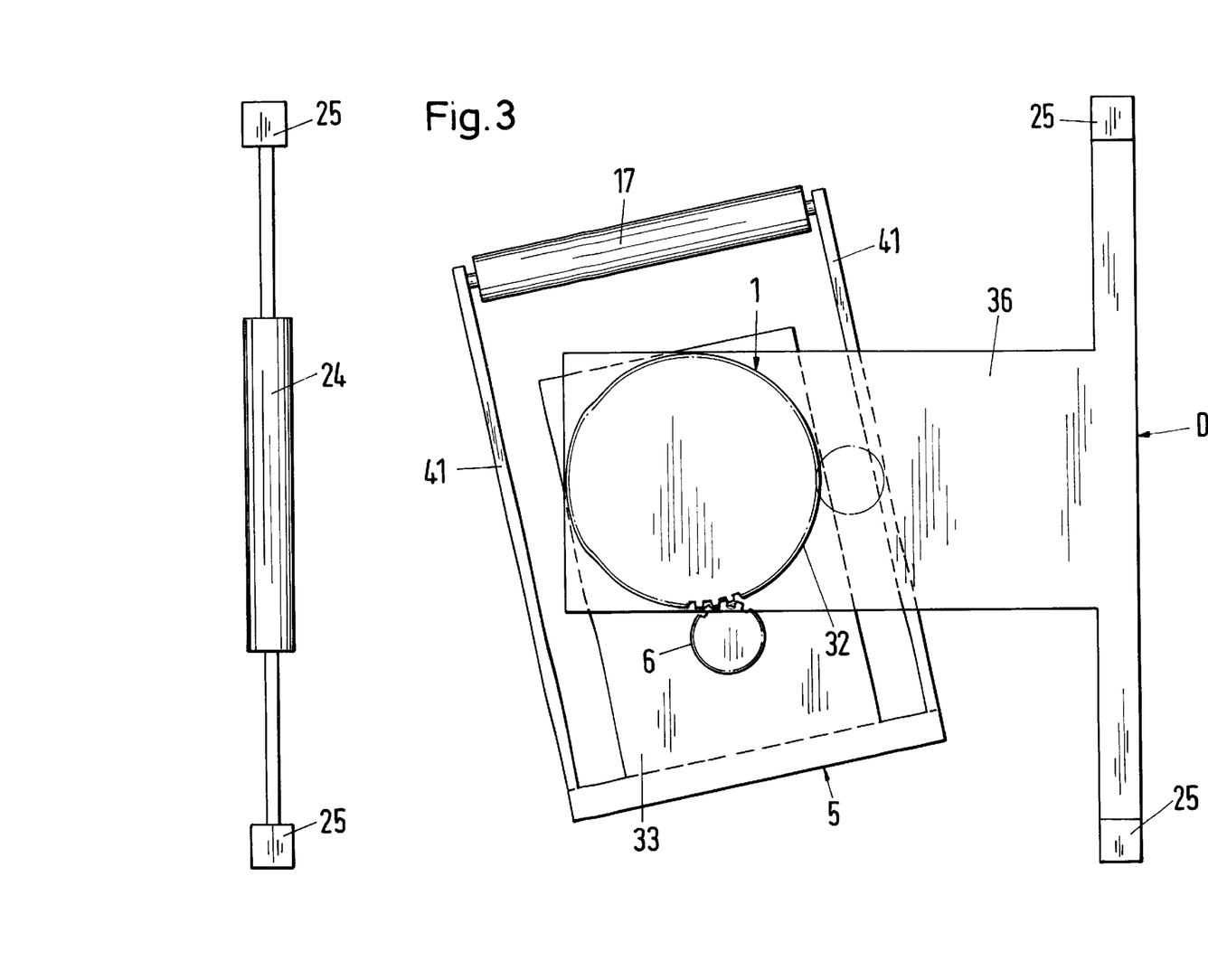
FIG. 3 shows a simplified plan view of a gearing bridge common to all planet wheel gearings of the reversing system in an instantaneous intermediate position of −78.3°, into which it has been swiveled from a 0E position.

The mode of functioning of the reversing transmission is explained below by means of FIGS. 3 to 6, the representation of which, for reasons of greater clarity, has been restricted essentially to the components of the individual planes under consideration. FIG. 3 shows that, when the drive shaft 14 rotates, the planet wheel 6 rolls off on the outer gear ring 32 of the turntable 1 acting as sun wheel, which is fixed at the frame stanchion 36 shown here as an extension arm and, at the same time, carries the gearing bridge 5 along. In the case of the example selected, the gearing bridge 5 executes a swiveling angle of ±90°.

Figure 4:
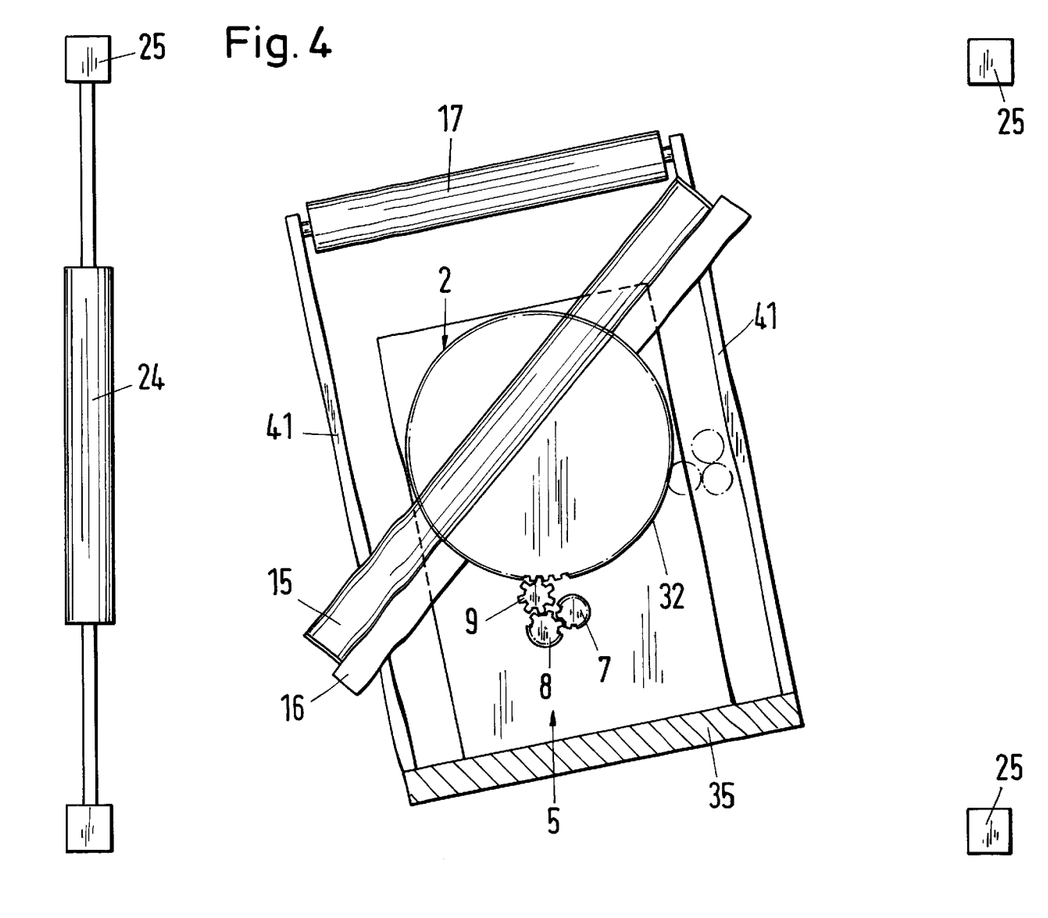
FIG. 4 shows a representation corresponding to that of FIG. 3, additionally showing the corresponding instantaneous position of a turning bar with a swiveling angle of ±45°.

FIG. 4 shows that the outer gear ring 32 of the turntable 2, acting as a sun wheel, meshes over intermediate wheels 8 and 9 with the planet wheel 7, which is firmly seated on the drive shaft 14. If the planet wheel 6 rolls off on the outer gear ring 32 of the turntable 1 and carries along the gearing bridge 5 (FIG. 3), the turntable 2 is carried along through the same angle of rotation, through which the gearing bridge 5 is turned, by the meshing of the teeth of the planet wheel 7 and of the intermediate wheels 8 and 9 with the outer gear ring 32 of the turntable 2. This planet wheel 7 has only half the number of teeth of the planet wheel 6, so that, since the planet wheel 7 also turns when the drive shaft 14 is turned, the outer gear ring 32 of the turntable 2 is turned back by half the angle of rotation of the gearing bridge 5 because of the second intermediate wheel 9 that brings about the change in direction. In this way, the outer gear ring 32 of the turntable 2 is swiveled through an angle of ±45°.

Figure 5:
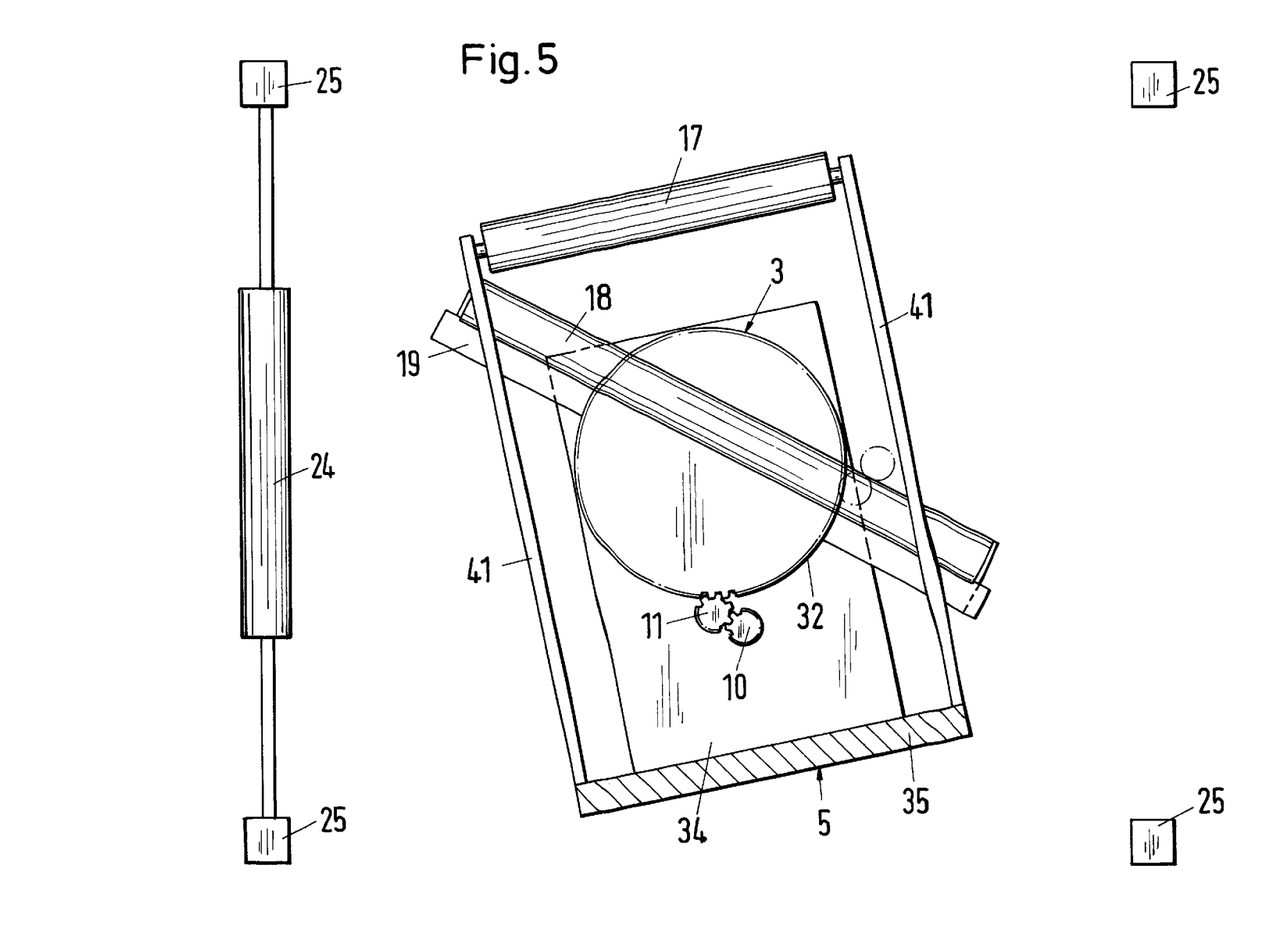
FIG. 5 shows a representation corresponding to that of FIG. 3, additionally showing the corresponding instantaneous position of a turning bar with a swiveling angle of ±135°.

As shown in FIG. 5, the outer gear ring 32 of the turntable 3 once again does not mesh directly with the planet wheel 10 as driving wheel, but meshes over an intermediate wheel 11. When the gearing bridge 5 is rotated, the gear ring 32 of the turntable 3 is carried along through the same angle of rotation. In addition, the outer gear ring 32 of the turntable 3 is turned further through half the angle of rotation of the gearing bridge 5. This is achieved once again owing to the fact that the planet wheel 10 has only the half the number of teeth of the planet wheel 6. By these means, the outer gear ring 32 of the turntable 3 is swiveled through an angle of ±135°.

Figure 6:
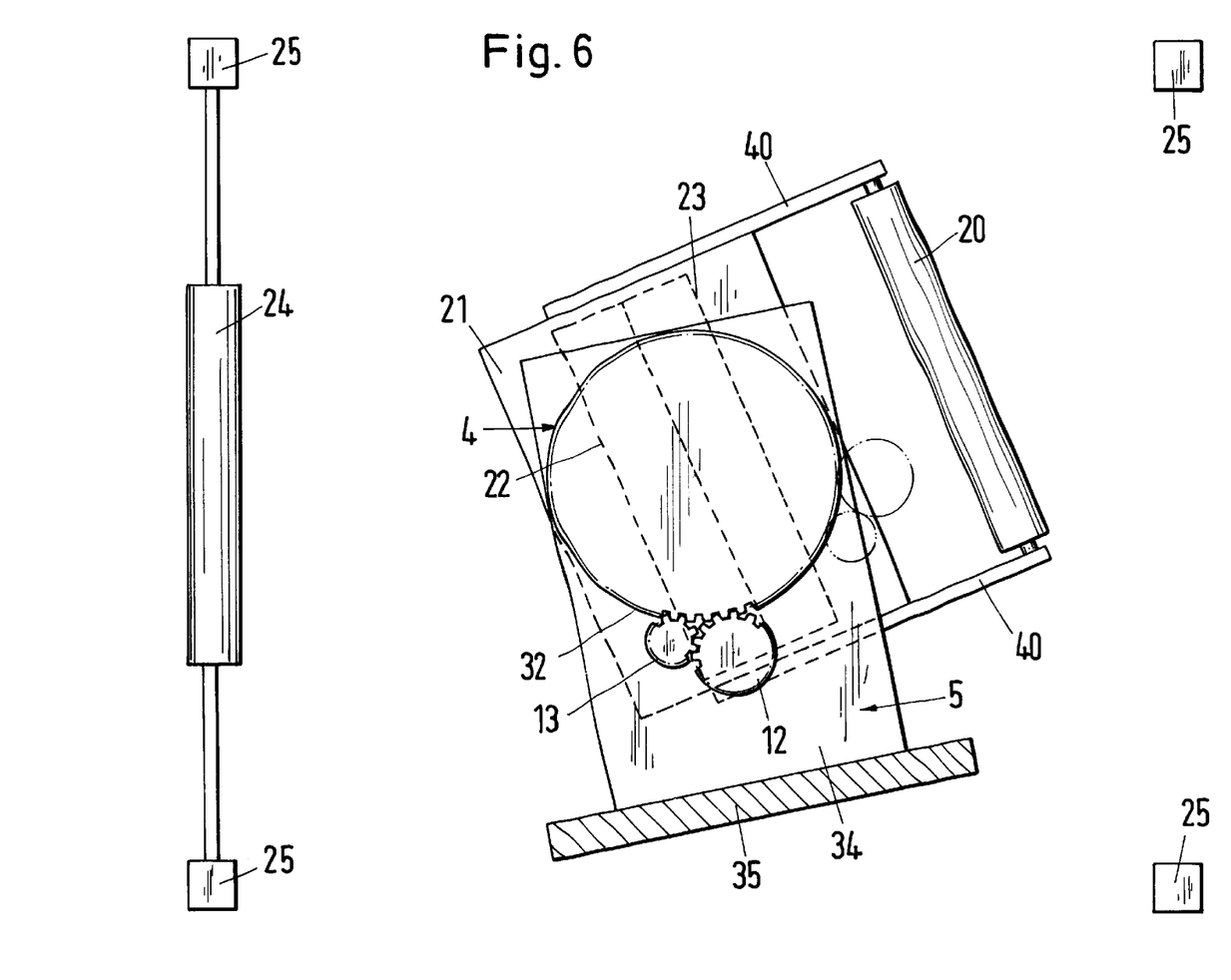
FIG. 6 shows a representation corresponding to that of FIG. 3, additionally showing the corresponding instantaneous position of collapsing boards with nip rolls, carrying out a swiveling angle of ±180°.

FIG. 6 shows that the outer gear ring 32 of the turntable 4 meshes with the planet wheel 12, which is seated firmly on the drive shaft 14. When the gearing bridge 5 is rotated, the gear ring 32 of the turntable is carried along through the same angle of rotation as the gearing bridge 5. The planet wheel 12 has the same number of teeth as the planet wheel 6 and, when the drive shaft 14 is rotated, the outer gear ring 32 of the turntable 4 is turned additionally further through the angle of rotation of the gearing bridge 5. The outer gear ring 32 of the turntable 4 is swiveled here through an angle of ±180°.

Accordingly, for the reversing system described here, with two turning bars 15, 18 and two deflecting rollers 17, 20 in four planes disposed one above the other, the maximum angles of rotation of the individual planes relative to one another amount to ±45°, ±90°, ±135° and ±180°. For the reversing transmission described, this function is achieved owing to the fact that the outer gear rings 32 of the turntables 1 to 4 all have the same number of teeth, two of the planet wheels, namely planet wheel 6 and 12, in turn, have a common, identical number of teeth, which can be divided by two, and the other two planet wheels, namely planet wheels 7 and 10, have half the number of teeth of the two planet wheels 6 and 12. The number of teeth of the intermediate wheels 8, 9, 11, 13 can be selected at random.

Instead of the described reversing system with two turning bars 15, 18 and two deflecting rollers 17, 20, which work together in four swiveling planes, which are at a distance from one another vertically, it may be sufficient, in simple cases, to provide only one turning bar and one deflecting roller in the reversing system, which accordingly work in two swiveling planes with appropriately dimensioned different swiveling angles. It is, however, just as well possible to provide three or more turning bars and, correspondingly, three or more deflecting rollers in a correspondingly more expensively configured reversing system. If the work is conducted in a total of six swiveling planes disposed one above the other, the swiveling angles of the individual planes can have a 30° graduation, from 30° to 180°, due to the appropriate selection of planet wheels.

Although the reversing transmission in the above description has been described as a gear wheel transmission, it is self-evident that the transmission can also be constructed according to the same guidelines as a chain gear or a toothed belt transmission using appropriate chain wheels or toothed belt wheels.

When the equipment is operating, tubular film 100 is taken off in the direction X and, after leaving the nip rolls 22, 23, moves down at an angle past the lowest turntable 4 and around the first deflecting roller 20, which is disposed in a first swiveling plane, and carries out in this a swiveling motion in the horizontal direction with an angle of ±180° together with the collapsing boards 26 and the nip rolls 22, 23. The tubular film 100 is then diverted around the first turning bar 18, which occupies a second horizontal plane and, in this, carries out a reversing swiveling motion of ±135°. From the turning rod 18, the tubular film 100 reaches the second deflecting roller 17, which is fastened to the gearing bridge 5 and located in the third plane, in which it carries out a reversing swiveling motion of ±90°. After that, the tubular film 100 reaches the fourth plane, which is the last plane in the example shown and in which a reversing motion is imparted to it through a swiveling angle of ±45° over the transmission described. The tubular film 100 is then taken over the deflecting roller 24 as a stationary conveying device to the severing equipment G or the two wind-up units E and F. The reversal of the reversing transmission at the end of the respective swiveling motion section can be accomplished over appropriately placed limit switches.

Figure 7:
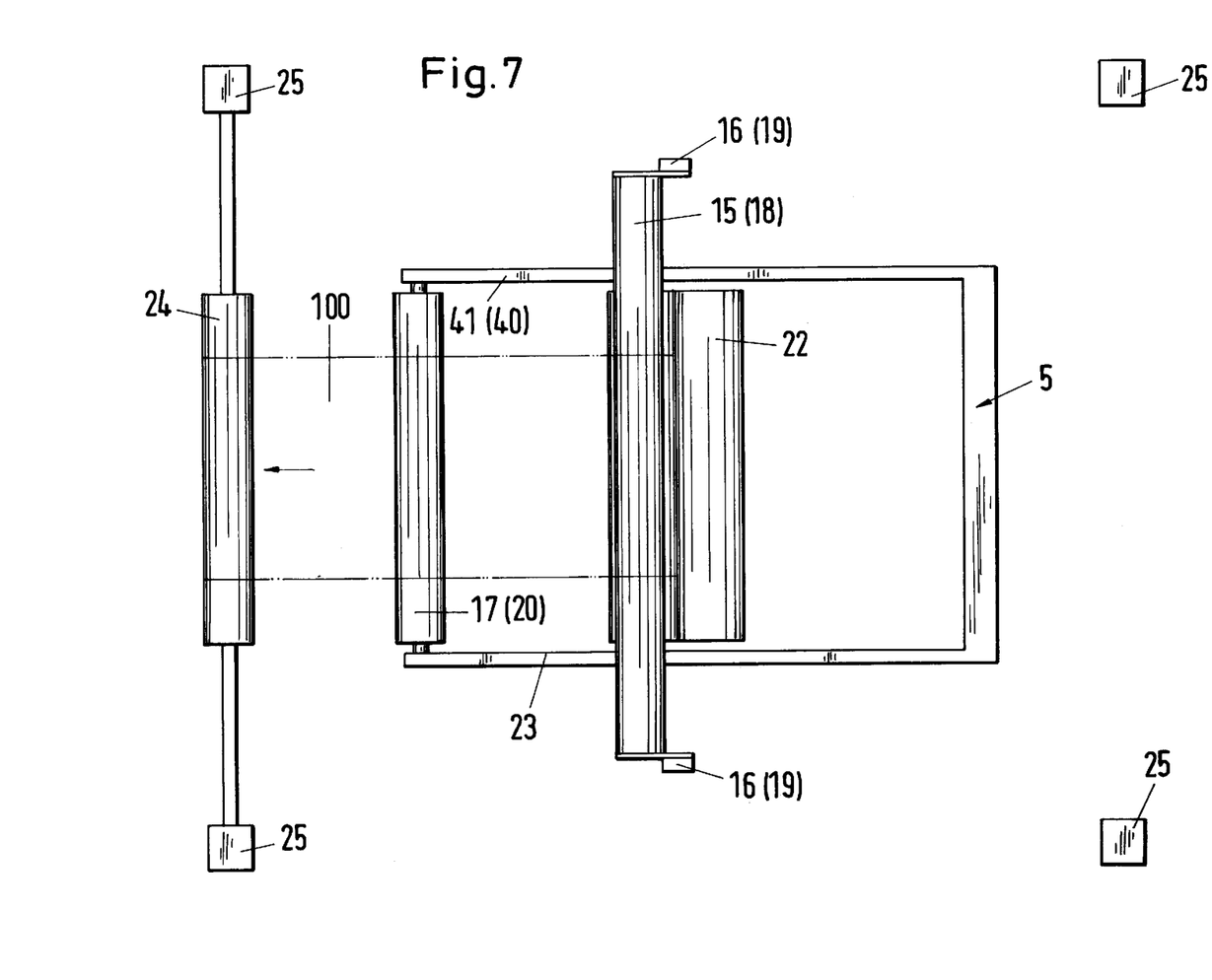
FIG. 7 shows a simplified plan view of the reversing take-off equipment in its 0° position of FIG. 2, corresponding to a middle position of the reversing path of the collapsing boards.
Figure 8:
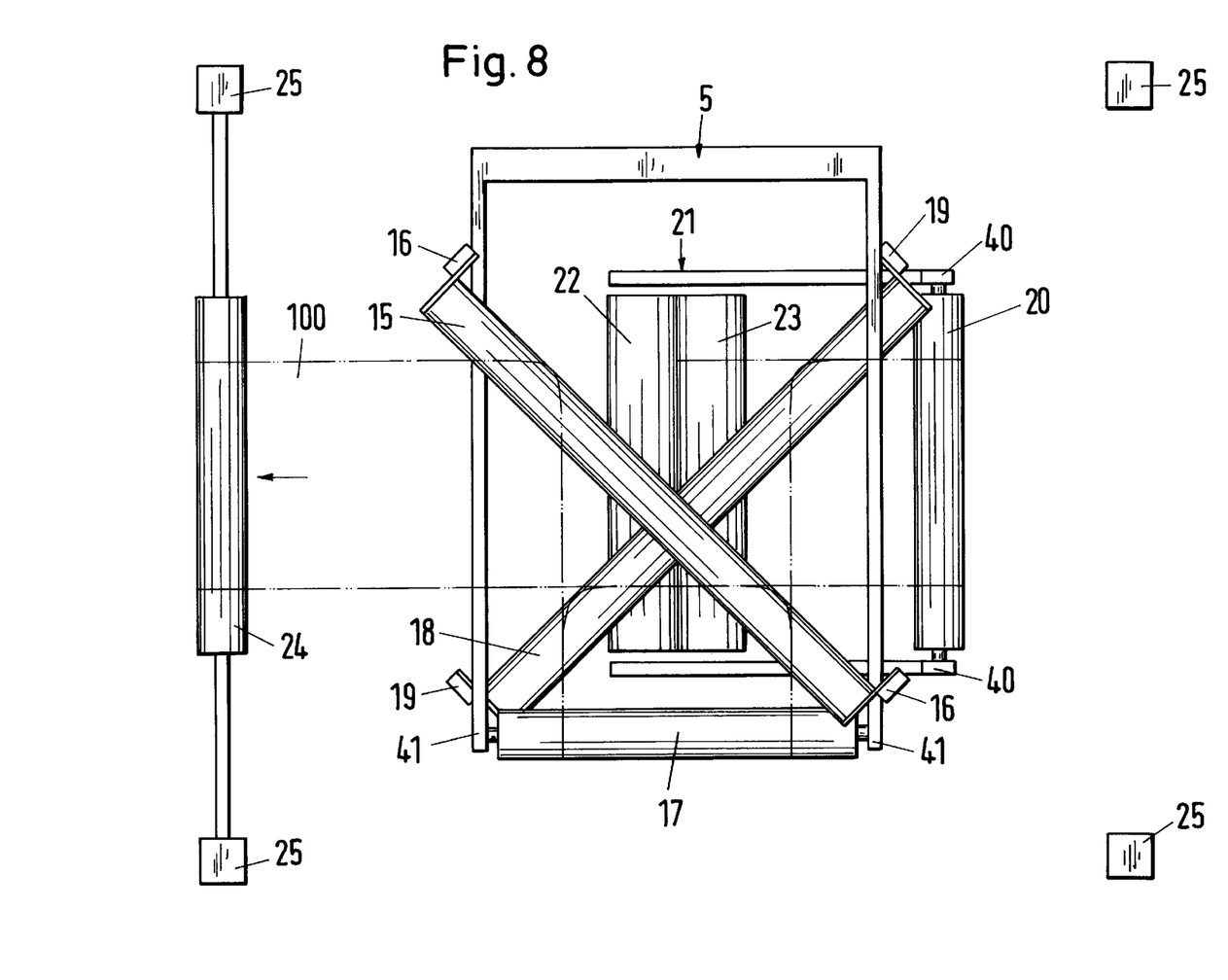
FIGS. 8 to 10 show representations corresponding to FIG. 7 to illustrate different operating position of the reversing parts of the take-off equipment, in each case after the collapsing boards have traversed a swiveling path of +180°, −180° or −78.3°, starting out from the center position of FIG. 7.
Figure 9:
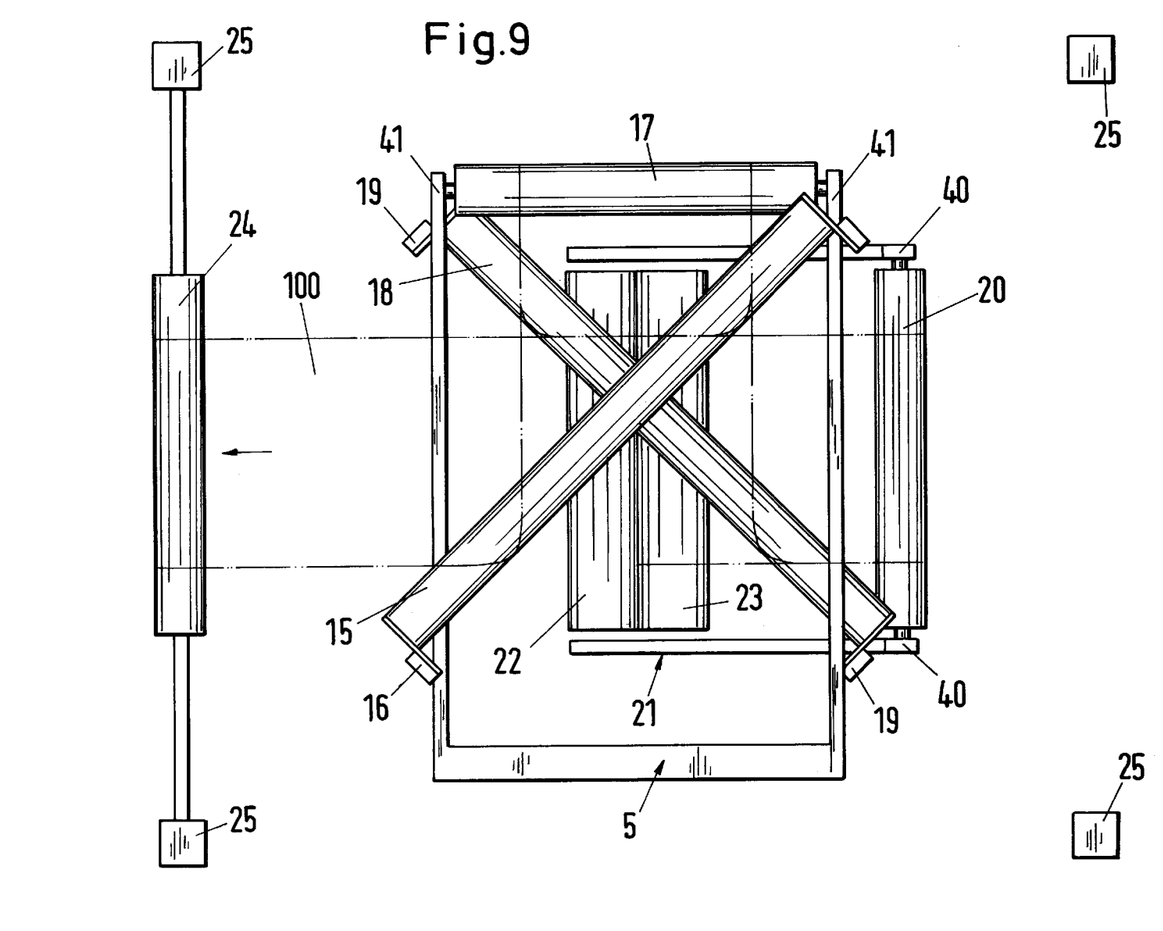
Figure 10:
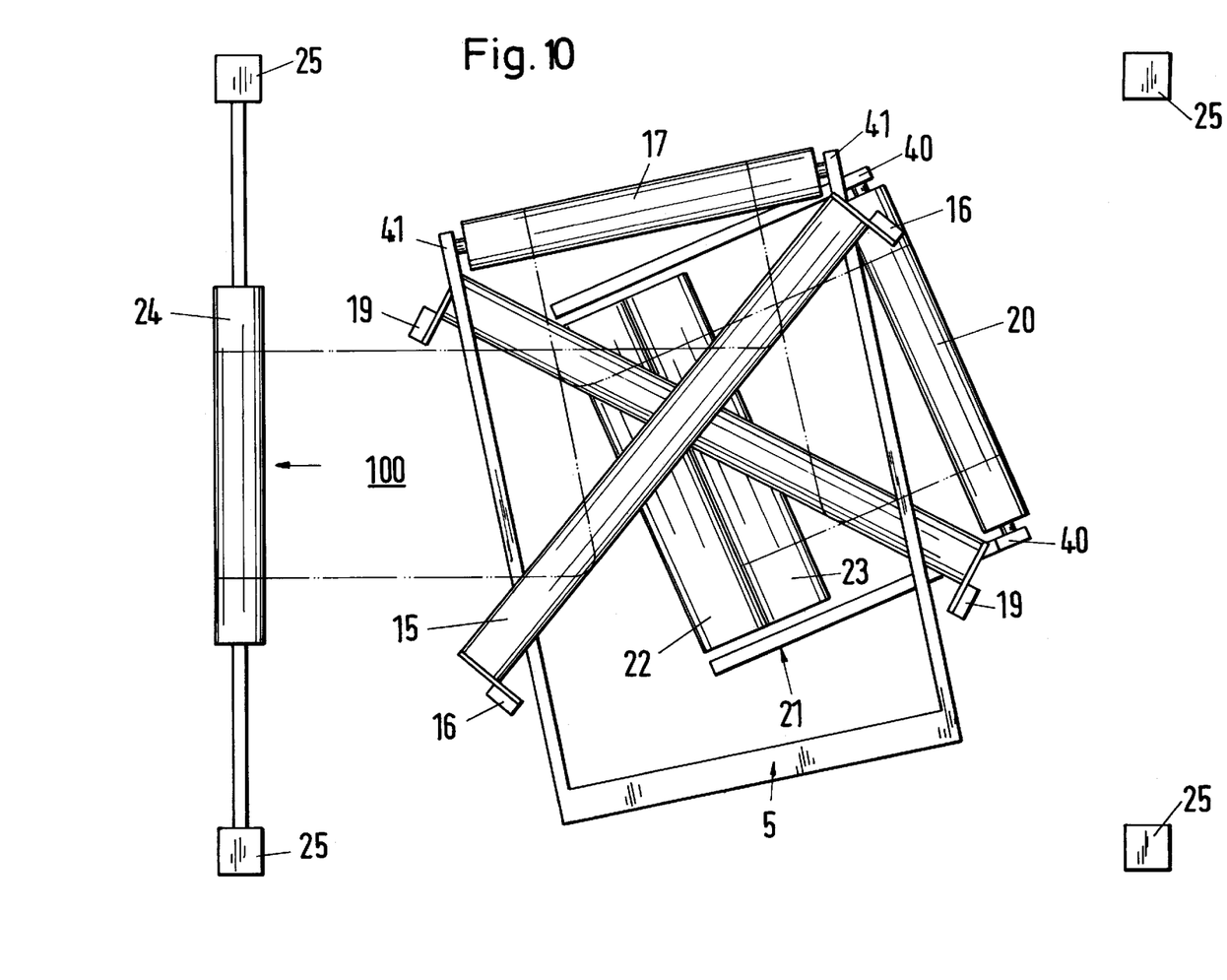

FIG. 7 shows a central position of the reversing take-off equipment 30, corresponding to the representation in FIG. 2. In this basic position, the deflecting rollers 17, 20, on the one hand, and the turning bars 15, 18 on the other, have an arrangement, which is mutually aligned in the vertical direction. Starting out from the middle position of FIG. 7, FIGS. 8 to 10, on the other hand, illustrate intermediate positions of the deflecting rollers 17, 20 and of the turning rods 15, 18 corresponding to an, in each case, continuous swiveling angle of +180° and −180° as well as −78.3° as an intermediate value according to the representation of FIG. 3. The nip rolls 22, 23 of the collapsing system, swiveled together with the deflecting roller 20, are also shown.

The turning bars 15 and 18 have a basic position with a distance from the central vertical axis 27 of the reversing system, which can be calculated from the formula of turning bar diameter×π/4 with which a lateral shifting of the tubular film 100 during the swiveling of the reversing system is counteracted. Insofar, with respect to the guidance of the tubular sheet 1 by the reversing system, the conditions that exist are the same as those described in detail in DE-C-20 35 584 and EP-B-0 408 996, which were mentioned above in connection with the state of the art.

What we claim is:

1. Take-off equipment for tubular sheets of plastic produced by an extruder with a stationary blowing head and wherein a collapsing device collapses the tubular sheet and conveying equipment transports the collapsed tubular sheet to wind-up equipment comprising:

reversing apparatus disposed between the collapsing device and the conveying equipment, said reversing apparatus including deflection rollers and turning bars;

a rotatably supported bridge;

turntables on said bridge, said turntables having a common vertical axis and being vertically spaced from one another;

said deflection rollers being mounted on said bridge;

holding devices holding said turning bars on some of said turntables;

frame mounting one of said turntables;

each of said turntables having an inner ring and an outer ring;

said inner rings being supported on said bridge; and a device mechanism mounted on said bridge and engageable with the outer rings of said turntables to effect relative rotation of said turntables and said frame to thereby swivel said deflection rollers and said turning bars relative to one another about said common axis;

wherein said bridge includes horizontal upper and lower bridge legs which support the inner rings of said turntables.

2. Take-off equipment according to claim 1 wherein said bridge includes a substantially vertical bridge leg, said upper and lower bridge legs extending from said vertical bridge leg, said bridge having one side on which said vertical bridge leg is disposed and an opposite open side from which the collapsed tubular sheet exits from the reversing apparatus.

3. Take-off equipment according to claim 1 wherein said bridge is rotatable relative to said frame, the inner ring of said one turntable being fixed to said upper bridge leg of said bridge and the outer ring of said one turntable being fixed to said frame.

4. Take-off equipment according to claim 3 wherein the reversing apparatus includes a side structure which carries said collapsing device and one of said deflection rollers, the inner ring of another of said turntables being fixed to said lower bridge leg of said bridge, the outer ring of said other turntable being fixed to said side structure.

5. Take-off equipment according to claim 3 wherein the inner ring of a further one of said turntables is fixed to said upper bridge leg of said bridge, one of said holding devices holding one of said turning bars on said outer ring of the last said turntable.

6. Take-off equipment according to claim 3 wherein the inner ring of a further one of said turntables is fixed to said lower leg of said bridge, one of said holding devices holding one of said turning bars on said outer ring of the last said turntable.

7. Take-off equipment according to claim 1 wherein each of said upper and lower bridge legs has an upper side and an underside, the inner ring of a first one of said turntables being supported on the upper side of said upper bridge leg, the inner ring of a second one of said turntables being supported on the underside of said upper bridge leg, the inner ring of a third one of said turntables being supported on the upper side of said lower bridge leg, and the inner ring of a fourth one of said turntables being supported on the underside of said lower bridge leg.

8. Take-off equipment according to claim 2 wherein said upper and lower bridge legs are vertically separated from one another by an intermediate region, said bridge having a support part disposed in said intermediate region, said support part extending from said vertical leg to said open end of said frame, one of said deflecting rollers being supported on said support part.

9. Take-off equipment according to claim 1 wherein said bridge includes a vertical connecting rod extending between said horizontal upper and lower bridge legs.

10. Take-off equipment for tubular sheets of plastic produced by an extruder with a stationary blowing head and wherein a collapsing device collapses the tubular sheet and conveying equipment transports the collapsed tubular sheet to wind-up equipment comprising:

reversing apparatus disposed between the collapsing device and the conveying equipment, said reversing apparatus including deflection rollers and turning bars;

a rotatably supported bridge;

turntables on said bridge, said turntables having a common vertical axis and being vertically spaced from one another;

said deflection rollers being mounted on said bridge;

holding devices holding said turning bars on some of said turntables;

a frame mounting one of said turntables;

each of said turntables having a first ring engaging a second ring;

said first rings being supported on said bridge; and a drive mechanism including a drive motor mounted on said bridge, said drive mechanism being engageable with said second rings of said turntables to effect relative rotation of said turntables and said frame to thereby swivel said deflection rollers and said turning bars relative to one another about said common axis;

wherein said bridge includes upper and lower bridge legs which support the inner rings of said turntables, each of said upper and lower bridge legs having an upper side and an underside, the first ring of a first one of said turntables being supported on the upper side of said upper bridge leg, the first ring of a second one of said turntables being supported on the underside of said upper bridge leg, the first ring of a third one of said turntables being supported on the upper side of said lower bridge leg, and the first ring of a fourth one of said turntables being supported on the underside of said lower bridge leg.

11. Take-off equipment according to claim 10 wherein said first to fourth turntables have maximum angles of rotation relative to one another of ±45°, ±90°, ±135° and ±180°.

12. Take-off equipment for tubular sheets of plastic produced by an extruder with a stationary blowing head and wherein a collapsing device collapses the tubular sheet and conveying equipment transports the collapsed tubular sheet to wind-up equipment comprising:

reversing apparatus disposed between the collapsing device and the conveying equipment, said reversing apparatus including deflection rollers and turning bars;

a rotatably supported bridge;

turntables on said bridge, said turntables having a common vertical axis and being vertically spaced from one another;

said deflection rollers being mounted on said bridge;

holding devices holding said turning bars on some of said turntables;

a frame mounting one of said turntables;

each of said turntables having a first ring engaging a second ring;

said first rings being supported on said bridge; and a drive mechanism including a drive motor mounted on said bridge, said drive mechanism being engageable with said second rings of said turntables to effect relative rotation of said turntables and said frame to thereby swivel said deflection rollers and said turning bars relative to one another about said common axis;

wherein said bridge includes a vertical bridge leg, said upper and lower bridge legs extending from said vertical bridge leg, said bridge having one side on which said vertical bridge leg is disposed and an opposite open side from which the collapsed tubular sheet exits from the reversing apparatus, said drive mechanism including a vertical drive shaft rotatably mounted on said bridge, said drive shaft having an axis spaced from said common vertical axis, said bridge further comprising a vertical connecting rod extending between said horizontal upper and lower bridge legs, said vertical connecting rod being spaced from said vertical drive shaft and from said vertical bridge leg.

* * * * *